United States Patent [19]

Takeoka et al.

[11] Patent Number: 5,750,588
[45] Date of Patent: May 12, 1998

[54] RADIATION-CURABLE SILICONE COMPOSITION

[75] Inventors: Toru Takeoka, Cincinnati; Stephen J. Clarson, Loveland; Barry Goldslager, Cincinnati, all of Ohio

[73] Assignee: Three Bond Co., Ltd., Japan

[21] Appl. No.: 720,325

[22] Filed: Sep. 27, 1996

[51] Int. Cl.$^6$ ............ C08L 83/05; C08L 83/07; C08F 2/50

[52] U.S. Cl. ............ 522/66; 522/64; 522/99; 528/15; 528/31; 528/32; 525/477; 525/478

[58] Field of Search .................. 525/477, 478; 528/33, 15, 31, 32; 522/99, 148, 64, 66

[56] References Cited

U.S. PATENT DOCUMENTS

| | | | |
|---|---|---|---|
| 4,421,904 | 12/1983 | Eckberg et al. | 528/27 |
| 4,563,514 | 1/1986 | Liu et al. | 427/54.1 |
| 4,626,583 | 12/1986 | Arkles | 528/34 |
| 4,935,483 | 6/1990 | Gamon et al. | 525/478 |
| 5,017,406 | 5/1991 | Lutz | 522/99 |
| 5,086,127 | 2/1992 | Itoh et al. | 525/474 |
| 5,198,520 | 3/1993 | Onishi et al. | 525/474 |
| 5,424,374 | 6/1995 | Okami | 525/478 |

FOREIGN PATENT DOCUMENTS

| | | |
|---|---|---|
| 3-181509 A | 8/1991 | Japan. |
| 5-222143 A | 8/1993 | Japan. |
| WO 81/02579 | 9/1981 | WIPO. |

*Primary Examiner*—Susan W. Berman
*Attorney, Agent, or Firm*—Scully, Scott, Murphy & Presser

[57] ABSTRACT

A one-part type radiation curable silicone composition capable of curing at an ordinary temperature is provided. The silicone composition comprises an unsaturated group-containing polyorganosiloxane and a polysilane in which at least one at least two silicon atoms are bonded to each other and which has at least one polyorganosiloxane group in a side chain thereof.

4 Claims, No Drawings

RADIATION-CURABLE SILICONE COMPOSITION

BACKGROUND OF THE INVENTION

The present invention relates to a one-part type radiation curable silicone composition which reacts and cures on exposure to an electron beam.

Heretofore, radiation curable silicones have been known compositions with unsaturated groups introduced in one or both ends or in side chains of a low molecular weight polydimethylsiloxane which may be a monomer or oligomer and with a photopolymerization initiator added which generates radicals upon exposure to an electron beam. For example, in JP55-112262A is disclosed a method of reacting an epoxy-containing acrylate silane with an amino-terminated polydimethylsiloxane oil to prepare a silicone resin having acryl reactive end group(s), and in JP3-181509A is disclosed a method of reacting a hydroxyl-containing polydimethylsiloxane oil with diisocyanate or acryl monomer.

Further, in JP58-53056B and JP2-180929A are proposed methacryl group-terminated compounds, and in JP59-204669A and JP5-202341A are proposed acryl group-terminated silicone hard coating agents. In JP64-14226A is proposed an acryl group-terminated silicone resin which cures gel-like upon exposure to an electron beam.

In JP60-215009A is proposed an acryl terminated silicone resin having both moisture-curability and photocurability. In JP61-258838A is proposed an ultraviolet-curing polysilacrylene-polysiloxane composition.

According to the above conventional methods, the crosslinking points in the final cured products have a carbon-carbon bond and thus heat resistance, cold resistance and flexibility, which are characteristics inherent in silicone, are impaired.

Also proposed is a method wherein an epoxy terminated silicone resin is crosslinked using a cationic photopolymerization initiator. In JP56-38350A is proposed an epoxy functional silicone intermediate, and in JP63-65115B is proposed a method of curing an epoxy-containing silane hydrolyzate with an onium salt. Cationic photocurable compositions involve various problems such as, for example, the problem of corrosion with Lewis acid produced at the time of curing and the problem of poor heat resistance and flexibility as is the case with acryl group.

In JP5-222143B is proposed an addition polymerization type silicone composition using polysilane, but the polysilane used is in the form of powder crystals, so is difficult to add and mix and difficult to handle; besides, for a photocurable composition, it takes time for curing, which requires 5 minutes or more, and is thus lacking in utility. The amount of the polysilane illustrated in the said patent is as large as 10 to 50 parts by weight. It is uneconomical to use the expensive polysilane in a large amount. Further, the polysilane used therein is of a molecular structure poor in flexibility and it is impossible to rely on it for improving the physical properties of the resulting cured product.

Addition polymerization type silicone compositions known heretofore are each a combination of mainly a low molecular weight polyorganosiloxane (incl. monomer or oligomer) having unsaturation with a hydrogen polysiloxane (inc. monomer or oligomer) and a metal complex as a curing catalyst. This is usually divided into two parts, the contents of which are mixed and stirred to cure at the time of use. Inevitably there are various problems to be solved such as, for example, the mixing being troublesome, unsatisfactory curing caused by erroneous mixing of components and the problem of pot life. Also marketed recently is a one-part type addition polymerization silicone using a reaction retarder, which, however, required cold storage or freeze storage and is thus not superior in working efficiency at all.

As a prior art attempt there also has been made an attempt of using as a photopolymerization initiator a silyl radical formed by the photodecomposition of polysilane, by joint research of Professor West, Wisconsin University, and 3M (U.S. Pat. No. 4,569,953). Further, a method of curing a silicone resin having unsaturation by the use of a polysilane photopolymerization initiator has been proposed by Hitachi, Ltd. (JP58-49717A), a method of expediting a photocuring reaction by the use of amines has been proposed by 3M Co. (U.S. Pat. No. 4,548,690), a method of using a peroxide has been proposed by Dow Corning Corp. (U.S. Pat. No. 4,626,583), and further a method of curing an acryl group-containing polydimethylsiloxane with dimethylsilane has been proposed by Petrarch Corp. (U.S. Pat. No. 4,626,583). In all of these methods, however, a polysilane is used as a radical polymerization initiator for a monomer or oligomer having unsaturation, or the use as a photoresist agent utilizing the photodecomposability of polysilane is intended.

OBJECTS OF THE INVENTION

It is an object of the present invention provides a one-part type radiation-curable silicone composition capable of improving two-part characteristics, shelf stability and curability which have not been fully satisfied by the conventional addition polymerization type silicone compositions.

Further objects and effects of the present invention will become apparent from the following description.

SUMMARY OF THE INVENTION

The present invention resides in an radiation-curable silicone composition comprising an unsaturated group-containing polyorganosiloxane, which may be monomer or oligomer, a polysilane with at least two silicon atoms attached thereto directly and having at least one polyorganosiloxane group in side chains, and an addition polymerization catalyst.

DETAILED DESCRIPTION OF THE INVENTION

As the unsaturated group-containing polyorganosiloxane used in the present invention there may be used one ingredient of a conventional addition polymerization type silicone composition. It is represented by the following general formula (A):

$$R_a^1 SiO_{(4-a)/2} \tag{A}$$

where $R^1$ is a substituted or unsubstituted monovalent hydrocarbon group, with $R^1$ corresponding to at least two substituents in one molecule being ethylenically unsaturated groups, e.g. alkenyl groups, bonded to different silicon atoms, and a is a number in the range from 1.8 to 2.3.

As examples of $R^1$ are mentioned alkyl groups such as methyl, ethyl, propyl, butyl, hexyl and octyl, alkenyl groups such as vinyl, allyl and hexenyl, aryl groups such as phenyl, and substituted hydrocarbon groups such as 3,3,3-trifluoropropyl. It is preferred that the number of carbon atoms in the substituent be up to 10. As mentioned above, at least two Si-bonded alkenyl groups are present in one molecule.

The polyorganosiloxane in question may be of a molecular structure having a straight chain or branched siloxane framework. The polymerization degree thereof is not specially limited, but usually employed is one having a viscosity at 25° C. in the range from 10 to 1,000,000,000 cPs.

The polysilane used in the present invention, to which are attached at least two silicon atoms directly and which has a polyorganosiloxane group in side chains, is represented by the following formula:

(B)

where $R^2$ is a hydrogen atom, a hydroxyl group, or a substituted or unsubstituted alkyl group having 1 to 10 carbon atoms, $R^3$ and $R^4$ are each a substituted or unsubstituted group having up to 10 carbon atoms and selected from alkyl, cycloalkyl, alkenyl and aryl, m+n is larger than 2, and $R^5$ is a polysiloxane group and is represented by the following general formula:

$$R_b^6 SiO_{(4-b)/2}$$ (C)

where $R^6$ is a hydrogen atom, a hydroxyl group, a substituted or unsubstituted monovalent hydrocarbon group, or a group represented by $OR^7$, with $R^7$ being a substituted or unsubstituted monovalent hydrocarbon group, and b is an integer falling under the range of $0 < b \leq 4$. The structural unit (C) is present as $R^5$ in a side chain of formula (B) or at an end of the polysilane chain. The presence of the polysiloxane group contributes to improvement in solubility to the unsaturated group-containing polyorganosiloxane, improvement of the curing speed and improvement in physical characteristics of the resulting cured product. The polymerization degree of the polysilane is not specially limited, but is usually in the range from 10 to 1,000,000 in terms of viscosity at 25° C.

The following are mentioned as examples of such polysiloxane group-containing polysilanes:

(D)

where $R^2$, $R^3$, $R^4$, n and m are as defined previously, X and Y are each independently a hydrogen atom, a hydroxyl group, or an alkyl, alkenyl or aryl group having 1 to 3 carbon atoms, $R^7$ to $R^{11}$ are each independently a hydrogen atom, a hydroxyl group, a substituted or unsubstituted alkyl, cycloalkyl, alkenyl or aryl group having 1 to 10 carbon atoms, or a group represented by $OR^7$, with $R^7$ being a substituted or unsubstituted monovalent hydrocarbon group, and p is an integer of 2 or more.

The following are also mentioned, having polysiloxane chains at the ends:

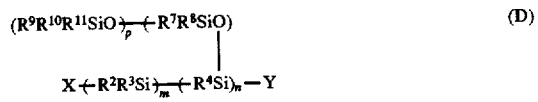

(E)

The polysilanes (D) and (E) may be prepared in a known manner. For example, polysilanes as starting materials can be prepared by reacting organochlorosilanes with an alkali metal (M) in a solvent such as, for example, toluene, xylene, or tetrahydrofuran.

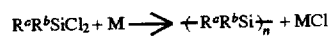

It is also possible to prepare an organohydropolysilane by adding an organosilane, etc. to butylzirconocene in toluene solvent.

(E)

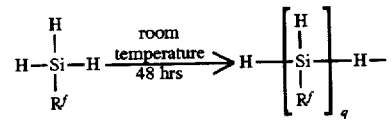

Further, the object substance, polydimethylsiloxane-grafted polysilane, can be obtained by chlorinating the compound (E) with carbon tetrachloride and subsequent reaction with a hydroxypolyorganosiloxane.

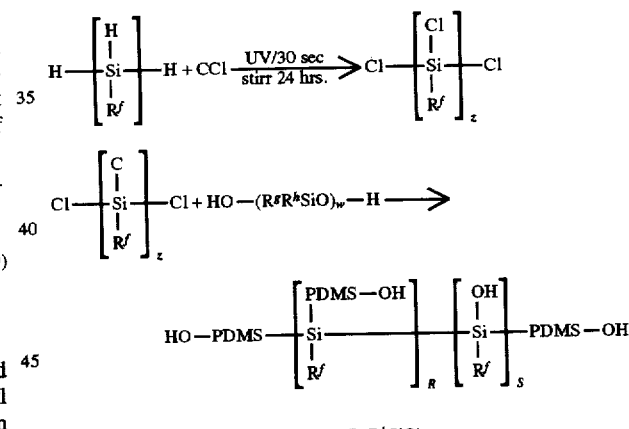

PDMS: $(R^fR^hSiO)_w$

It is also known to prepare the object substances (D) and (E) by the addition reaction of Si—CH=CH$_2$ and Si—H. For example, a polysiloxane-grafted polysilane is obtained by the addition of vinylpolyorganosiloxane to the polysilane compound (E).

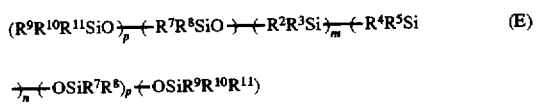

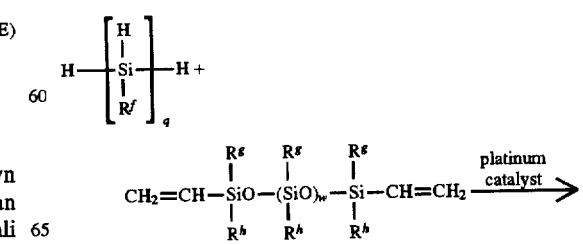

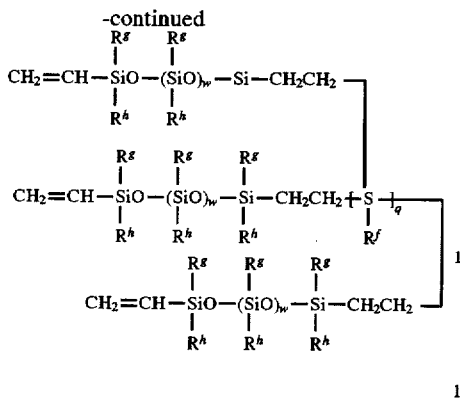

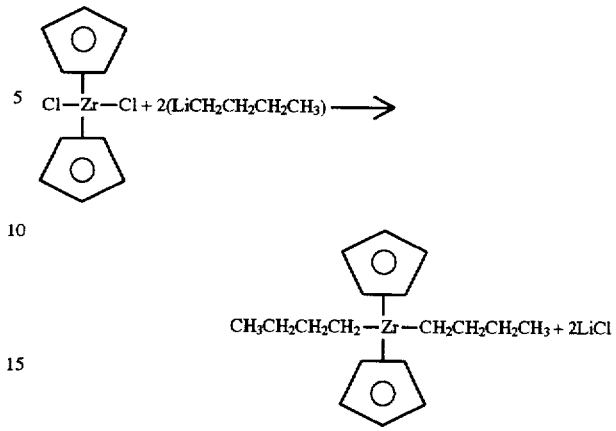

In the present invention, as a curing catalyst there is used an addition polymerization catalyst for hydrosilylation reactions. As the addition polymerization catalyst there may be used a known addition polymerization catalyst such as a platinum-based catalyst. Platinum-based catalysts are particularly useful, examples of which include platinum metal, a platinum-octanol complex (Lamoreaux's catalyst) described in U.S. Pat. No. 4,743,377, a platinum-vinyl group-containing disiloxane complex (Karsted's catalyst) described in U.S. Pat. No. 3,814,730, a platinum-vinyl group-containing cyclosiloxane complex (Ashby's catalyst) described in U.S. Pat. No. 4,288,345, and a platinum-phosphite complex. The amount of the curing catalyst to be used, which may be the same as in the prior art, is in the range from 0.1 to 5,000 ppm relative to the vinyl group-containing polyorganosiloxane.

The composition of the present invention cures easily in a short time upon exposure to ultraviolet light. The polysilane upon exposure to ultraviolet light decomposes and produces hydrosilane, which is presumed to react with vinylsiloxane and solidifies in the presence of a platinum catalyst. At the same time, a radical curing reaction of unsaturated groups with each other is also presumed to occur.

EXAMPLES

Working examples of the present invention will be described below, but it is to be understood that the scope of the invention is not limited by the working examples. Parts and % appearing in the following working and comparative examples all represent parts by weight and % by weight, respectively. And all the values of viscosity are at 25° C.

Preparing Polydimethylsiloxane-grafted Polysilane

Run (1) - Preparing Polysilane ①

Into a 200 ml flask were added 40 ml of toluene dried using metallic sodium and a small amount of benzophenone as an indicator, followed by refluxing and distillation. Into the toluene was then added and dissolved 0.312 g of zirconocene dichloride and stirring was performed under cooling to 0° C. Further, into the resulting solution was added 1.35 ml of an n-butyllithium solution in hexane and stirring was conducted for 16 hours to afford dibutylzirconocene.

To the product thus obtained was then added 6 g of polysilane, followed by stirring for 16 hours, to yield a brown product. This product was washed with three 100 ml portions of toluene in a 200-mesh Florisil's column (9 cm×3 cm) and purified in an evaporator to give 5.3 g of hydrophenylpolysilane in 90% yield. This product was determined for ¹HNMR and GPC and proved to be a hydrophenylpolysilane having a molecular weight of 800 g/mol relative to polystyrene.

Then, 50 ml of carbon tetrachloride was added to the hydrophenylpolysilane, followed by radiation of 365 nm ultraviolet light for a short time and 24 hr. stirring. Thereafter, the solvent was removed and the reaction product was determined for ¹HNMR and FT-IR spectrum. As a result, the product was found to be trichlorophenylpolysilane having a structure wherein the hydrogen bonded to silicon atom was replaced by chlorine atom.

Next, 20.369 g of a hydroxy-terminated polydimethylsiloxane (Huls PS340) having an average molecular weight of 400 to 700 g/mol was added to 4.7 g of the trichlorophenylpolysilane and stirring was performed for 3 hours in 50 ml of toluene, allowing reaction to take place, followed by washing with distilled water and drying, to afford a hydroxyl-terminated polydimethylsiloxane-grafted polysilane (polysilane ①). This product was determined for HNMR, GPC and FT-IR spectrum to find that it was the object substance.

Run (2) - Preparing Polysilane ②

9 g of a polysiloxane having vinyl group at one end thereof (Gelest, STV 9090,0) was added to 3 g of the hydrogen polysilane prepared in Run (1) and was allowed to react in toluene using a platinum-divinyltetramethyldisiloxne complex as catalyst. The chemical reaction formula concerned is as shown below. After refluxing for about 8 hours, there was obtained a phenylpolysilane (polysilane ②) with polydimethylsiloxane grafted thereto, in 70% yield, which was found to be the object substance as a result of measurement of ¹HNMR and GPC.

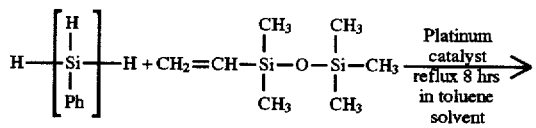

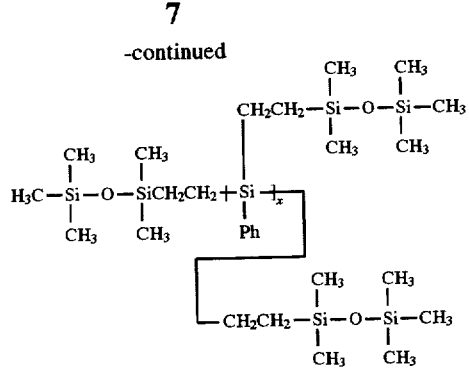

The following experiments were conducted using the polysilanes prepared above and using the compositions tabulated below, in which tables are also shown the results of curing tests made by the use of an ultraviolet irradiator (Model MC-6·H Vulve, a product of Fusion Corp.).

|  | Example 1 | Example 2 | Example 3 | Example 4 | Example 5 |
|---|---|---|---|---|---|
| Vinyl-containing Polyorganosiloxane CPS443 (Huls) 1000 cst | 100 | 100 | — | — | 100 |
| Vinyl-containing Polyorganosiloxane PS444 (Huls) 5000 cst | — | — | 100 | 100 | — |
| Polysilane ① | 1 | — | 1 | — | 1 |
| Polysilane ② | — | 1 | — | 1 | — |
| Platinum-divinyl tetramethyl disiloxane Complex PC072 (Huls) | 0.01 | 0.01 | 0.01 | 0.01 | — |
| Platainum-cyclovinyl methyl siloxane Complex SIP6832.0 (Gelest) | — | — | — | — | 0.01 |
| Compatibility | ○ | ○ | ○ | ○ | ○ |
| Curability | ○ | ○ | ○ | ○ | ○ |
| UV radiation time to cure | 30 sec | 30 sec | 60 sec | 60 sec | 30 sec |
| State of Cure | Rubbery | Rubbery | Rubbery | Rubbery | Rubbery |

COMPARATIVE EXAMPLES

The following experiments were conducted using the following compositions tabulated below.

|  | Com. Ex. 1 | Com. Ex. 2 | Com. Ex. 3 | Com. Ex. 4 | Com. Ex. 5 |
|---|---|---|---|---|---|
| Vinyl-containing Polyorganosiloxane CPS443 (Huls) 1000 cst | 100 | 100 | 100 | 100 | 100 |
| Vinyl-containing Polyorganosiloxane PS444 (Hus) 5000 cst | — | — | — | — | — |
| Polysilane ① | 1 | — | — | — | — |
| Polysilane ② | — | 1 | — | 10 | — |
| Polydmethyl silane PSS-1M01 (Gelest) | — | — | 1 | 10 | — |
| Polydimethyl phenyl silane PSS-1P01 (Gelest) | — | — | — | — | 1 |
| Platinum-divinyl tetramethyl disiloxane Complex PC072 (Huls) | — | — | 0.01 | 0.01 | 0.01 |
| Platinum cyclovinyl methylsiloxane Complex SIP6832.0 (Gelest) | — | — | — | — | — |
| Compatibility | ○ | ○ | Δ | x | Δ |
| Curability | x | x | x | Δ | x |
| UV radiation time to cure | — | — | — | 10 min. or more | — |
| State of Cure | Uncured | Uncured | Uncured | Surface flash | Uncured |
| Vinyl-containing Polyorganosiloxane CPS443 (Huls) 1000 cst | 100 | — | — | — | — |
| Vinyl-containing Polyorganosiloxane PS444 (Hus) 5000 cst | — | 100 | 100 | 100 | 100 |
| Polysilane ① | — | 1 | — | — | — |
| Polysilane ② | — | — | 1 | — | — |
| Polydimethyl silane PSS-1M01 (Gelest) | — | — | — | 1 | 10 |
| Polydimethyl phenyl silane PSS-1P01 (Gelest) | 10 | — | — | — | — |
| Platinum-divinyl tetramethyl disiloxane Complex PC072 (Huls) | 0.01 | — | — | — | — |
| Platinum cyclovinyl methylsiloxane Complex SIP6832.0 (Gelest) | — | — | — | 0.01 | 0.01 |
| Compatibility | x | ○ | ○ | — | x |
| Curability | x | x | x | x | x |
| UV radiation time to cure | 10 min. | — | — | — | 5 min.–10 min. |
| State of Cure | only Surface cured | Uncured | Uncured | Uncured | Surface flash |

In the tables, ○ means excellent, Δ means good and X means bad, respectively.

According to the present invention there is obtained an addition polymerization type cilicone composition capable of being cured in a short time at an ordinary temperature, and conventional two-part type compositions or compositions requiring heat treatment come to be curable in a short time upon exposure to radiation at an ordinary temperature thus making it possible to widen the application range of silicone, in comparison with conventional polysilanes, both compatibility with silicone and photcurability are improved.

What is claimed is:

1. A radiation-curable silicone composition comprising a polyorganosiloxane which includes an alkenyl group; a polysilane in which at least two silicon atoms are bonded to each other and which has at least one polyorganosiloxane group in a side chain thereof; and a catalytically effective amount of an addition polymerization catalyst.

2. The composition of claim 1 wherein said polyorganosiloxane has the general formula $R^1_a SiO_{(4-a)/2}$ where $R^1$ is monovalent unsubstituted hydrocarbyl or monovalent hydrocarbyl substituted with a trifluoro-containing group, with the proviso that at least two $R^1$ groups in the molecule are alkenyls; and a is the range of 1.8 to 2.3.

3. The composition of claim 1, wherein said polysiloxane is represented by the following general formula:

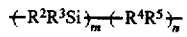

where $R^2$ is a hydrogen atom, a hydroxyl group, or a substituted or unsubstituted alkyl group having 1 to 10 carbon atoms, $R^3$ and $R^4$ are each independently selected from substituted or unsubstituted alkyl, cycloalkyl, alkenyl and aryl groups each having up to 10 carbon atoms, m+n is larger than 2, and $R^5$ is represented by the following general formula:

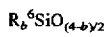

where $R^6$ is a hydrogen atom, a hydroxyl group, a substituted or unsubstituted monovalent hydrocarbon group, or a group represented by $OR^7$, with $R^7$ being a substituted or unsubstituted monovalent hydrocarbon group, and b is an integer falling under the range of $0 < b \leq 4$.

4. The composition of claim 1, wherein said addition polymerization catalyst is a platinum catalyst.

* * * * *

UNITED STATES PATENT AND TRADEMARK OFFICE
CERTIFICATE OF CORRECTION

PATENT NO. : 5,750,588
DATED : May 12, 1998
INVENTOR(S) : Toru Takeoka, et al.

It is certified that error appears in the above-identified patent and that said Letters Patent is hereby corrected as shown below:

Column 5, line 5: "S" should read --Si--

Column 8, line 11: "Polydmethyl" should read --Polydimethyl--

Signed and Sealed this

Eighth Day of August, 2000

Attest:

Q. TODD DICKINSON

*Attesting Officer*           *Director of Patents and Trademarks*

UNITED STATES PATENT AND TRADEMARK OFFICE
CERTIFICATE OF CORRECTION

PATENT NO. : 5,750,588
DATED : May 12, 1998
INVENTOR(S) : Toru Takeoka, et. al.

It is certified that error appears in the above-identified patent and that said Letters Patent is hereby corrected as shown below:

Title page, item [73], Assignee: after "Japan" insert --and University of of Cincinnati, Ohio--

Signed and Sealed this

Fifth Day of December, 2000

Q. TODD DICKINSON

Attest:

Attesting Officer

Director of Patents and Trademarks